United States Patent [19]

Boyd

[11] Patent Number: 4,758,020

[45] Date of Patent: Jul. 19, 1988

[54] VEHICLE TETHERING SYSTEM FOR BOTH ENERGIZING AND RESTRAINING PORTABLE ELECTRICAL DEVICES USED BY PASSENGERS

[76] Inventor: James B. Boyd, Rte. 6, Box 6052, Hermiston, Oreg. 97838

[21] Appl. No.: 98,790

[22] Filed: Sep. 21, 1987

[51] Int. Cl.$^4$ .............................................. B60R 22/00
[52] U.S. Cl. ................................... 280/801; 297/468
[58] Field of Search ............... 280/801, 808, 727, 270, 280/273; 297/482, 483, 468

[56] References Cited

U.S. PATENT DOCUMENTS 4,673,195 6/1987 Boyd et al. ....................... 280/801

Primary Examiner—Kenneth R. Rice

Attorney, Agent, or Firm—Chernoff, Vilhauer, McClung & Stenzel

[57] ABSTRACT

A tethering system for restraining the movement of portable electrical devices such as games, toys, radios and tape players used by vehicle passengers, while supplying electrical current for operating such electrical devices, is employed in combination with a power switch which permits electrical current to be supplied to an electrical device only when the passenger seat belt assembly is coupled. The system includes a tethering member which is connected to the vehicle independently of the seat belt buckle assembly for detachably connecting to the electrical device. The tethering member also has electrical conductors for receiving electrical current from the power switch and conducting it to an electrical outlet on the tethering member.

6 Claims, 2 Drawing Sheets

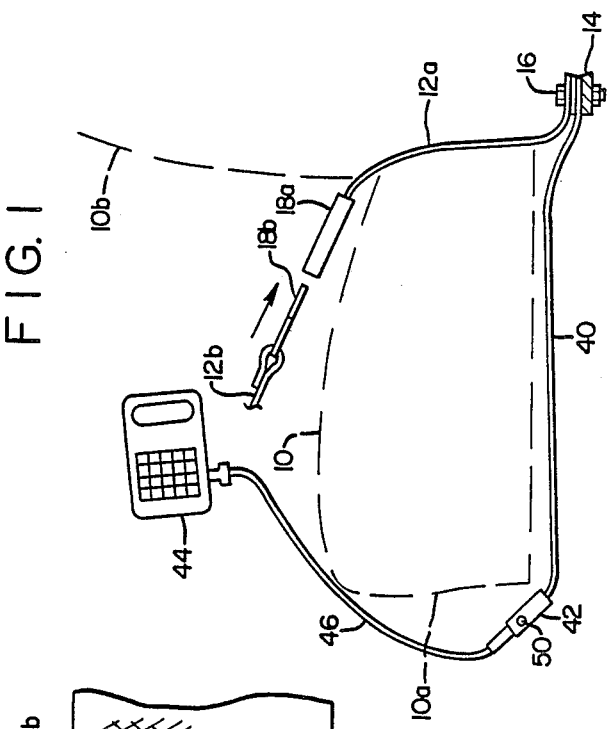
FIG. 1
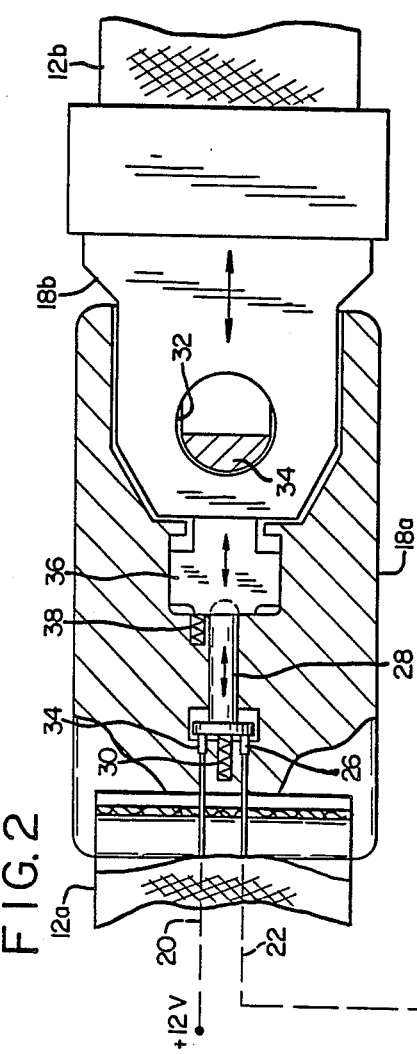
FIG. 2
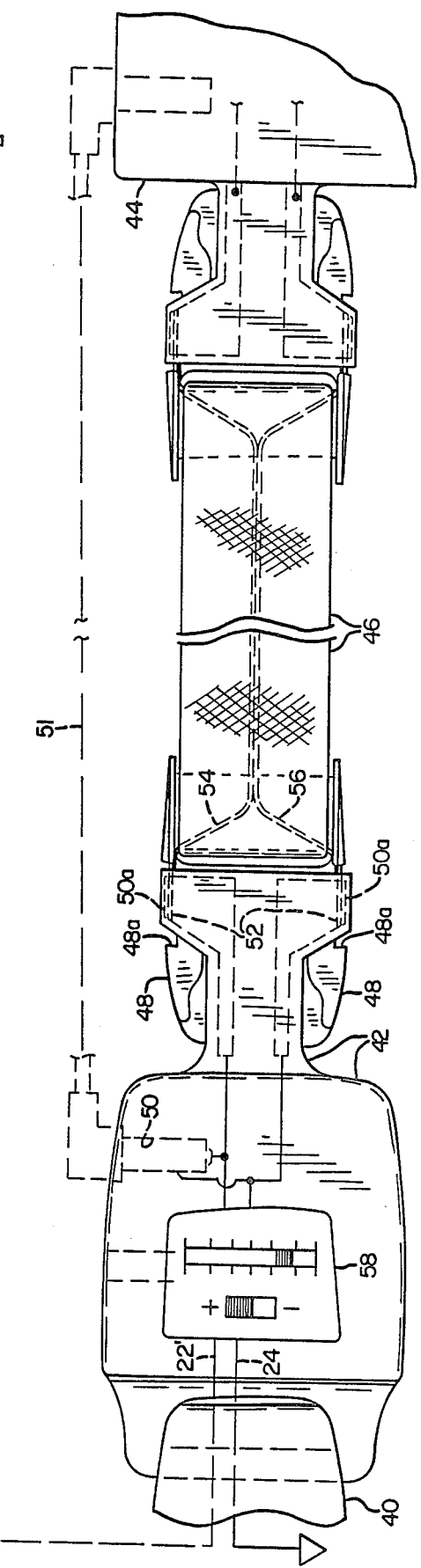

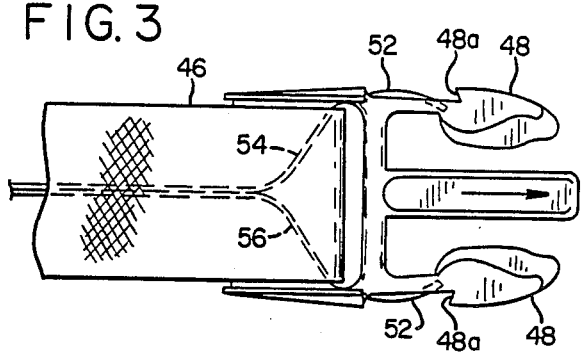
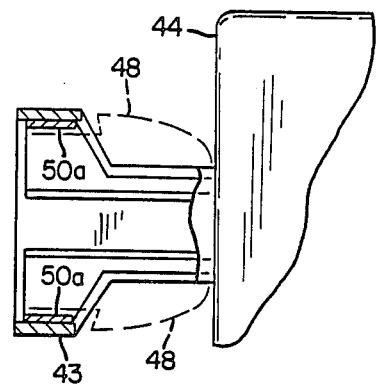
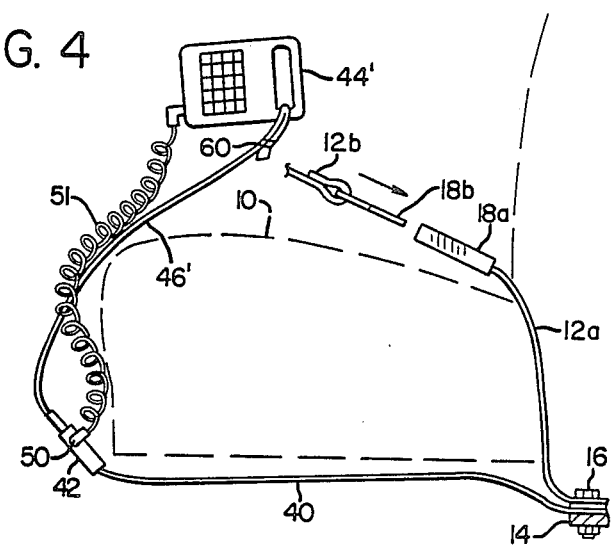
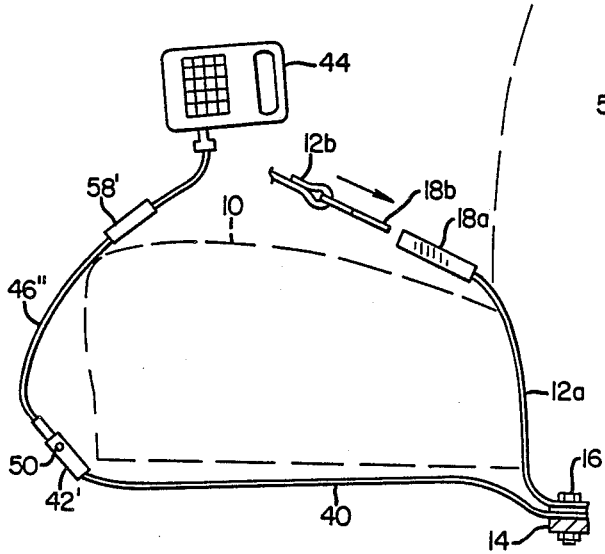
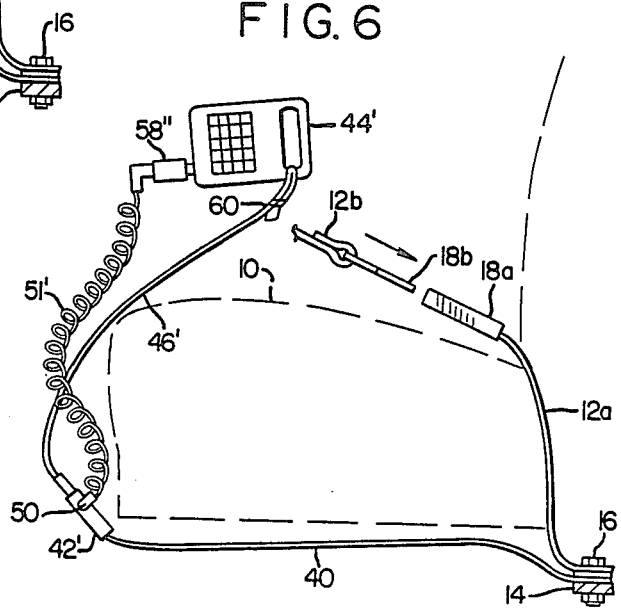

VEHICLE TETHERING SYSTEM FOR BOTH ENERGIZING AND RESTRAINING PORTABLE ELECTRICAL DEVICES USED BY PASSENGERS

BACKGROUND OF THE INVENTION

The present invention relates to a vehicle tethering system for restraining movement of portable electrical devices such as games, toys, radios and tape players used by vehicle passengers. More particularly, the tethering system is employed in combination with a system for encouraging passenger seat belt use by providing an electrical outlet for powering such electrical devices which is energized only in response to the buckling of the passenger's seat belt.

U.S. Pat. No. 4,673,195, of which the present inventor is a co-inventor, discloses a system for encouraging use of passenger seat belts in a vehicle by providing an electrical outlet for energizing portable electrical devices used by passengers, in response to the buckling of the passenger seat belt. A possible objection to such a system, however, is that it also inherently encourages passenger use of such portable electrical devices which, in case of a collision, may fly uncontrollably about in the passenger compartment possibly striking one or more passengers. The electrical cord extending from the electrical outlet on the seat belt buckle to the portable electrical device, as shown in the aforementioned U.S. Patent, is not suitable to restrain movement of the electrical device because it can easily become unplugged from the seat belt buckle assembly or from the electrical device when tension is applied.

Another possible objection to such a system is that the location of the electrical outlet on the seat belt buckle assembly may, when an electrical cord is connected thereto, interfere with the ease of coupling and uncoupling the buckle assembly.

SUMMARY OF THE PRESENT INVENTION

The present invention is an improvement to the prior system disclosed in U.S. Pat. No. 4,673,195, which is incorporated by reference herein. The invention resolves the aforementioned possible objections to the system by providing a flexible tethering member having detachable connector means for connecting portable electrical devices to the vehicle independently of the seat belt buckle assembly, so as to restrain such devices against free movement within the passenger compartment. Moreover, the flexible tethering member also provides a location for the electrical outlet, for powering the electrical devices, which is remote from the seat belt buckle assembly and therefore cannot interfere with the ease of operation thereof.

The detachable connector means of the flexible tethering member, and the electrical outlet, may be integral with each other so that both a strong restraining connection and an electrical connection occur simultaneously. Moreover, the flexible tethering member makes it possible to locate a variable voltage regulator for the electrical outlet at a location which is likewise remote from the seat belt buckle assembly. Preferably, the flexible tethering member extends beneath the passenger seat, extending forwardly from the front face thereof to the detachable connector means and to the electrical outlet.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a side view of a typical vehicle passenger seat with a first embodiment of the invention shown in simplified schematic form.

FIG. 2 is a detailed, enlarged schematic drawing of the major components of the embodiment of FIG. 1.

FIG. 3 is a drawing of a portion of the embodiment of FIG. 1 with parts detached.

FIG. 4 is a side view of a typical vehicle passenger seat showing a second embodiment of the invention schematically.

FIG. 5 is a side view of a typical vehicle passenger seat showing a third embodiment of the invention schematically.

FIG. 6 is a side view of a typical vehicle passenger seat showing a fourth embodiment of the invention schematically.

DETAILED DESCRIPTION OF THE INVENTION

With reference to FIGS. 1 and 2, a conventional vehicle passenger seat 10 having a front face 10a and a backrest 10b is shown. Through the opening between the backrest 10b and the cushion of the seat, the inner segment 12a of a passenger seat belt extends, one end being anchored to the vehicle floor 14 by a bolt 16 and the other end terminating at the female portion 18a of the seat belt buckle assembly. The male portion 18b of the buckle assembly terminates the outer segment 12b of the seat belt assembly, which normally comprises a combination shoulder strap and lap strap in accordance with conventional practice. The inner segment 12a of the seat belt assembly is constructed in accordance with the aforementioned U.S. Pat. No. 4,673,195 so as to have a pair of electrical conductors 20 and 22 extending therealong between the two sewn-together panels of the strap. The female portion 18a of the belt buckle assembly is likewise constructed so as to terminate each of the conductors 20 and 22 at a respective terminal 24 and 26, normally forming an open circuit until a plunger 28 is depressed into contact with the terminals 24 and 26 against the biasing force of a spring 30, thereby electrically connecting the two terminals 24 and 26. Depression of plunger 28 occurs in response to the coupling of the belt buckle assembly by the insertion of portion 18b into portion 18a such that the aperture 32 in the male portion 18b is engaged by catch 34 of latch 36. In the process of such coupling, latch 36 is moved inwardly against spring 38, thereby depressing plunger 28 into contact with terminals 24 and 26. Conversely, upon uncoupling of the seat belt buckle assembly, the spring 30 pushes the plunger 28 out of contact with the termnals 24 and 26.

Attached to the vehicle, also by the bolt 16 and independently of the seat belt buckle assembly, is a flexible tethering member 40 which extends underneath the seat 10 and forwardly from the face 10a thereof terminating in a connector 42 detachably engaging a portable electrical device such as an electronic game 44 as shown, or a toy, radio, tape player, etc. Although the tethering member 40 could be long enough to reach completely to the electrical device 44 when in its operative position, it is preferable that the member 40 terminate at its detachable connector 42 at the bottom of the front face 10a of the seat 10 so that it cannot tangle with the feet of the passengers. A strap 46 then detachably couples to the connector 42 by any suitable tension-resistant coupling, such as resilient prongs 48 which are insertable through mating sleeves in the connector 42 until exterior shoulders 48a latch outwardly to engage the rear edges of the sleeves to prevent the strap 46 from being pulled from the tethering member 40. Disconnection is accomplished simply by pressing the resilient prongs 48 inwardly thereby disengaging the shoulders 48a from the rear edges of the sleeves. The opposite end of the strap 46 may be detachably connected to the electrical device 44 in a like manner as shown in FIG. 3 or, alternatively, may be permanently connected to the electrical device 44, perhaps serving as part of a shoulder strap. In any case, the tethering member 40, preferably employing a detachable extension strap such as 46, detachably connects the electrical device 44 to the vehicle in a manner which is independent of and remote from the seat belt buckle assembly to restrict movement of the electrical device within the passenger compartment, particularly in case of collision.

The tethering member 40 can also serve to supply the electrical outlet, for powering the electrical device 44, at a location remote from the seat belt buckle assembly. As seen in FIG. 2, conductor 22 of the seat belt inner segment 12a is connected to an electrical conductor 22' which extends between the sewn panels of the tethering member 40 together with another conductor 24 which is connected to ground. Conduits 22' and 24 are in turn connected to an electrical outlet located on the detachable connector 42 for supplying electrical current to the electrical device 44 in response to the depression of plunger switch 28 by the coupling of the seat belt buckle assembly 18a, 18b. The electrical outlet may take the form of a standard outlet 50 which is functionally separate from the detachable connector 42, and supply current to the electrical device 44 by an auxiliary cord 51. Alternatively, the electrical outlet may be functionally integral with the connector 42 so that the tethering connection and electrical connection to the electrical device 44 are made simultaneously. The latter structure is exemplified by electrical contacts 50a on the interior of the connector sleeves which engage mating contacts 52 on the prongs 48 of the extension strap 46. The contacts 52 in turn are connected through conductors 54 and 56 which extend through the strap 46 and make electrical contact with the electrical device 44 in a similar detachable fashion through a connector 43 (FIG. 3) or, alternatively, as a permanently wired connection.

A variably adjustable voltage regulator 58 may optionally be provided to controllably vary the voltage and, if desired, the polarity, of the current supplied at the electrical outlets 50 and 50a, respectively, so as to match the input voltages for which different portable electrical devices such as 44 are designed. Such voltage regulator may be of the type depicted, for example, in the aforementioned U.S. Pat. No. 4,673,195 or, alternatively, may vary the voltage by selectively varying the base voltage of a PNP transistor whose emitter is connected to conductor 22' and whose collector is connected to the electrical outlet 50 or 50a.

Alternative embodiments are depicted in FIGS. 4-6. In FIG. 4, the electrical device 44' has no built-in provision for connection of the extension strap 46. Accordingly, electrical power is supplied from the electrical outlet 50 through a standard auxiliary cord 51 while extension strap 46' employs a buckle 60 at its end opposite the connector 42 for making a universal looped connection to the electrical device.

The embodiment of FIG. 5 is similar to that of FIGS. 1-3, except that the voltage regulator 58' is positioned on the extension strap 46" rather than on the detachable connector 42'.

The embodiment of FIG. 6 is a composite of the features of FIGS. 4 and 5 in that the universal buckle-type extension strap 46' is used to restrain an electrical device 44' having no built-in connection for the strap, and an auxiliary electrical cord 51' is used to provide power to the electrical device from the electrical outlet 50. Variable voltage regulator 58" is located on the auxiliary cord 51' rather than on the detachable connector 42'.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a vehicle having a passenger seat belt assembly with a selectively detachable buckle assembly, an electrical outlet for supplying current to an electrical device, and electrical switch means responsive to the coupling and decoupling of said buckle assembly for selectively energizing said electrical outlet in response to the coupling of said buckle assembly and de-energizing said electrical outlet in response to the decoupling of said buckle assembly, the improvement which comprises means for tethering said electrical device to said vehicle, to restrain its movement with respect to said vehicle, comprising:

(a) a flexible tethering member connected to said vehicle independently of said buckle assembly and having selectively detachable connector means thereon for connecting said electrical device to said flexible tethering member;
   (b) means for mounting said electrical outlet on said flexible tethering member; and
   (c) electrical conductor means extending along said flexible tethering member interconnecting said switch means with said electrical outlet.

2. The apparatus of claim 1 wherein said electrical outlet is integral with said selectively detachable connector means.

3. The apparatus of claim 1 wherein said electrical outlet and said selectively detachable connector means include means for connecting them to said electrical device independently of each other.

4. The apparatus of claim 1 wherein said flexible tethering member includes selectively adjustable voltage regulating means connected to said electrical outlet for variably regulating the voltage at which current is supplied to said electrical device.

5. The apparatus of claim 1, further including selectively adjustable voltage regulating means detachably connectable to said electrical outlet for variably regulating the voltage at which current is supplied to said electrical device.

6. The apparatus of claim 1 wherein said vehicle has a passenger seat having a front face, and wherein said flexible tethering member extends from beneath said seat forwardly of the front face thereof to said detachable connector means.

* * * * *